US011213749B2

United States Patent
Ederer

(10) Patent No.: US 11,213,749 B2
(45) Date of Patent: Jan. 4, 2022

(54) NETWORKED MEMORY ENHANCEMENT GAME USING CUSTOMIZABLE IMAGES

(71) Applicant: 2018 Systems, Inc., Prairie du Sac, WI (US)

(72) Inventor: John Ederer, Prairie du Sac, WI (US)

(73) Assignee: 2018 Systems, Inc., Prairie du Sac, WI (US)

( * ) Notice: Subject to any disclaimer, the term of this patent is extended or adjusted under 35 U.S.C. 154(b) by 93 days.

(21) Appl. No.: 16/747,256

(22) Filed: Jan. 20, 2020

(65) Prior Publication Data

US 2020/0230500 A1    Jul. 23, 2020

Related U.S. Application Data

(60) Provisional application No. 62/794,829, filed on Jan. 21, 2019.

(51) Int. Cl.
| | | |
|---|---|---|
| *A63F 13/533* | (2014.01) | |
| *A63F 13/80* | (2014.01) | |
| *A63F 13/52* | (2014.01) | |
| *A63F 13/61* | (2014.01) | |
| *A63F 13/798* | (2014.01) | |
| *G06F 3/0484* | (2013.01) | |

(52) U.S. Cl.
CPC ............ *A63F 13/533* (2014.09); *A63F 13/52* (2014.09); *A63F 13/61* (2014.09); *A63F 13/798* (2014.09); *A63F 13/80* (2014.09); *A63F 2300/5506* (2013.01); *A63F 2300/558* (2013.01); *A63F 2300/6009* (2013.01); *A63F 2300/80* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 6,964,416 | B2 * | 11/2005 | McClintic | .............. G07F 17/32 |
| | | | | 273/273 |
| 2011/0098108 | A1 * | 4/2011 | Kuper | ................... A63F 13/655 |
| | | | | 463/29 |

OTHER PUBLICATIONS

"Concentration Rules and Gameplay". From Ducksters.com via The Way Back Machine (www.archive.org). [dated Aug. 20, 2017], [online], [retrieved on Jun. 16, 2021]. Retrieved from the Internet <URL: https://web.archive.org/web/20170820083529/https://www.ducksters.com/games/concentration_rules.php>. 4 pages.*

* cited by examiner

*Primary Examiner* — Lawrence S Galka
(74) *Attorney, Agent, or Firm* — Joseph T. Leone, Esq.; DeWitt LLP

(57) ABSTRACT

The present invention is a networked, customizable game for exercising and improving memory and recall that can be played by from one to multiple players. The game is easily played by young and old players alike. The game can be customized by creators as well as sponsored by commercial ventures. The game is dimensioned and configured so as to create and to play a highly individualized, memory-exercising protocol via mobile "smart" phones and over the Internet. The game can also be configured to limit the players to those potential players within pre-selected geographic distance from the player initiating the game.

13 Claims, 19 Drawing Sheets

NETWORKED MEMORY ENHANCEMENT GAME USING CUSTOMIZABLE IMAGES

CROSS-REFERENCE TO RELATED APPLICATIONS

Priority is hereby claimed to provisional application Ser. No. 62/794,829, filed Jan. 21, 2019, which is incorporated herein by reference.

BACKGROUND

1. Field of the Invention

Disclosed herein is a computer game, specifically a computer game for improving memory capable of customization.

2. Background of the Invention

It is well known that many people suffer some level of memory loss and increased time needed to recall facts and figures with advancing age. This is due to a huge range of factors, including Alzheimer's disease and other neurologic disorders. The loss of memory associated with aging, head injuries, and certain illnesses is generally most frustrating to the person suffering from such memory loss. Recognition of the impairment can lead to depression and other problems. While some advances in therapy and treatment have been made in recent years to ameliorate the rate memory impairment, it has proven an intractable phenomenon of advancing age.

Various activities have been used for treating such memory loss, such as the use of board games played with and by persons suffering from memory loss. In many instances, such board games can provide mental stimulus and can be of great value in assisting persons to maintain their current level of memory or to slow the rate of memory impairment. Unfortunately, such activities and games to date generally rely on the use of the same basic figures, designs and pictures, which can lead to boredom and often lack the infusion of family socialization as part of the exercise. In addition, the game is uniquely designed so as to be able to combine the use of short-term memory with long-term memory in the same exercise.

Accordingly, there is a need for a networked, customizable, memory-enhancing game which may be played by one or more persons. There is a further need for a game which can be implemented via the Internet or via an application (an "app") stored and executed on a mobile device. The game should be configured to be tailored, updated, and modified, by each individual player, as needed or desired, to keep it fresh. It is also desirable for the game to provide a secondary level of questioning relative to the first level of questioning.

BRIEF SUMMARY

Disclosed herein is a first method of providing a memory-enhancing game on at least one networked computing device. The method comprises:

storing a plurality of source images on the at least one networked computing device;

associating each of the plurality of source images with a corresponding pair of virtual objects on at least one graphical user interface (GUI) on the at least one networked computing device, each virtual object in each pair of virtual objects having a first state in which the source image associated with the virtual object is not displayed on the at least one GUI and a second state in which the source image associated with the virtual object is displayed on the at least one GUI;

displaying on the at least one GUI a plurality of the corresponding pairs of virtual objects, in randomized positions, with all of the virtual objects in the first state;

receiving a selection of two virtual objects from at least one player, wherein a selected virtual object in the first state will convert the selected virtual object into the second state for a pre-selected period of time after which the selected virtual object returns to the first state, wherein if the two virtual objects are associated with the same source image, the at least one player is awarded at least one point and the two virtual objects remain in the second state on the at least one GUI or are removed from the at least one GUI; and repeating receiving a selection of two virtual objects from at least one player until each virtual object remains in the second state on the at least one GUI or is removed from the at least one GUI.

Disclosed herein is a second method of providing a memory-enhancing game on a plurality of networked computing devices. The method comprises:

storing a plurality of source images on a corresponding plurality of networked computing devices;

associating each of the plurality of source images with a corresponding pair of virtual objects on a plurality of graphical user interfaces (GUIs) on the plurality of networked computing devices, each virtual object in each pair of virtual objects having a first state in which the source image associated with the virtual object is not displayed on the plurality of GUIs and a second state in which the source image associated with the virtual object is displayed on the plurality of GUIs;

displaying on the plurality of GUIs a plurality of the corresponding pairs of virtual objects, in randomized positions, with all of the virtual objects in the first state;

receiving a selection of two virtual objects from at least one player on one of the plurality of GUIs, wherein a selected virtual object in the first state will convert the selected virtual object into the second state for a pre-selected period of time after which the selected virtual object returns to the first state, wherein if the two virtual objects are associated with the same source image, the at least one player is awarded at least one point and the two virtual objects remain in the second state on the plurality of GUIs or are removed from the at plurality of GUIs; and repeating permitting at least one player to select two virtual objects until each virtual object remains in the second state on the plurality of GUIs or is removed from the plurality of GUIs.

DETAILED DESCRIPTION

Figure 1:
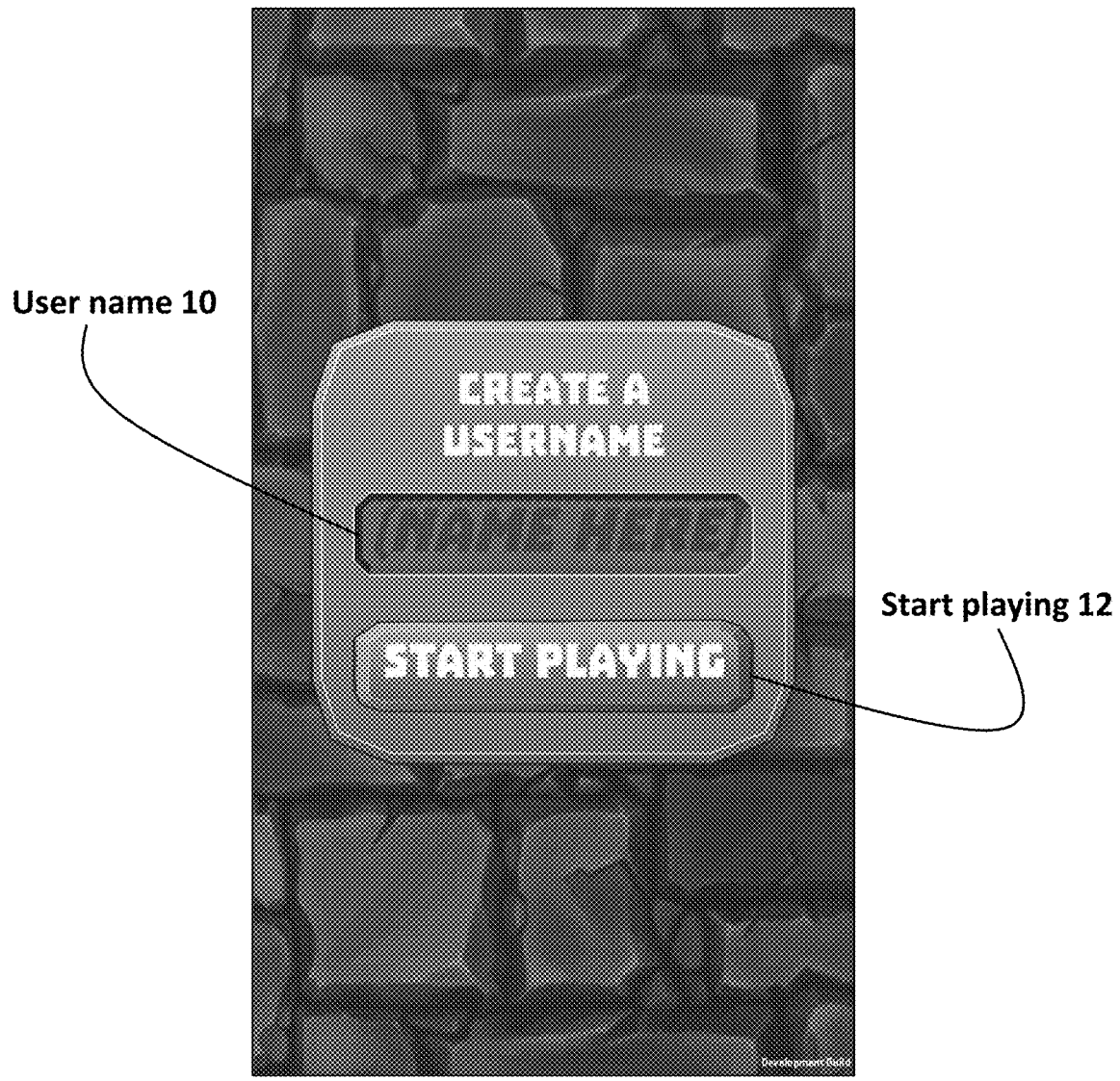
FIG. 1 is an exemplary screen shot of the log-in page for the game.

Disclosed herein is a computer-based, networked method for creating and playing a customizable memory game. Before creating the game, a game creator may first give the game a name. The name may be a unique or quasi-unique alphanumeric string. In order to participate in the game, a player must enter the correct name if such game is a "Private Game." As such, the name may act as a password of sorts to control game participation.

Once the name has been selected, the game itself provides a platform for the game creator to select a set number of paired display objects. More or fewer display objects can be used to make the game more difficult or less difficult. Each pair of display objects can be customized with pictures or symbols. Once a picture or symbol has been assigned to a pair of display objects, the display objects can be further customized with a secondary question. For example, the secondary question could require identification of a symbol or person shown on the display object. Once pictures or symbols are assigned to each pair of display objects and, if selected, a secondary question has been assigned to each pair of display objects, the computer-based method shuffles the display objects and places them in an array visible to one or more players or users of the game.

Once the game has been created, and the array of display objects has been created, is ready for use. The game may be played via an internet connection, a local area network (LAN) or wide area network (WAN), or an application.

Players are then invited to join the game. The game is configured so that the creator of the game can send an electronic notification, via a global computer network (e.g., the Internet) or via protocols for implementing wireless local area networks (WLAN) (e.g., using well-known and conventional digital communication protocols such as the IEEE 802.11 family of protocols) to intended users of the game.

Likewise, game users can search for games by name or location and/or other identification criteria. The creator of each game can restrict the number of users of a specific game, if so desired.

The game creator can also set up games in a way that users of the game are allowed to add subject matter to the display objects via a mobile application or via a computer. The game creator can also limit the number of display objects that a user can modify. In both cases, users can add pictures or symbols to the pairs of display objects and if set up by the creator, set up a secondary question to be asked once a pair of display objects is paired by a user.

The creator can further establish a sponsor category. A sponsor can, for example, upload its logo or another electronic advertisement via an application or via the Internet. The logo would be displayed on the display object prior to their selection during game play by a user.

As indicated above, users can be invited to the game via electronic notification. At that point, the user can access the game via computer or, for example, mobile device application. Once accessed, the game can be played either singly or by multiple players over the internet. It is further possible to provide a text window or chat window such that the players can talk with one another while playing the game.

The game is device-independent and may be implemented on any type of microprocessor-controlled computing device, such as, but not limited to, a desktop computer, a laptop computer, tablet devices (such as Apple's iPad-brand tablet computers), and smart phones.

The full gamut of game play is best disclosed via an exemplary implementation of the game as shown in the attached figures. In the exemplary version of the game, game play is structured in a form analogous to a card game in which all of the cards of a standard 52-card deck are set face-down randomly on a surface. The players then turn over cards to face-up, two-at-a-time, in an effort to locate pairs of cards whose face-up image matches. That is, at each player's turn, the player selects two cards and turns them face-up. At the same time, the other players must concentrate on the images shown in the two cards that are turned face-up. If the image on the two cards matches (say two "9" cards or two "Jack" cards), the player removes the pair from the playing surface and retains them as points scored (and takes another turn). If the images on the face of the two cards turned face-up do not match, the two cards are again turned face-down and placed in the same position on the playing surface as prior to being flipped face-up. That ends the first player's turn. The next players then play in the same fashion. As each player takes a turn, the other players of the game learn, and attempt to retain in memory, the identity of the images that did not match and their locations on the playing surface. When a player's turn comes around, the player then uses that knowledge in an effort to turn over two cards that they remember bore the same image. Play continues until all 52 cards have been matched into 26 pairs. The player who matched the most pairs of cards wins the game. In this fashion, the players' memories are constantly engaged as they are exposed to new information. Adult players, though, tend to tire of the game quickly because the images in a standard deck of cards are unchanging and well-known. The challenge level is difficult to adjust, either to increase or decrease.

In the present game, in contrast, the images presented to the players to be matched are selected by the players themselves and can be or represent anything: photos of people, places, things, symbols, maps, geographic points of interest, buildings, monuments, famous works of art, American Presidents, etc. There is no limit to the number of paired images that can be used at the start of the game or the nature of the paired images. Each image, however, must appear in two of the playing pieces or objects so that they can be matched.

As used herein, the term "cards," "playing pieces," "virtual objects," and "objects," are used interchangeable and synonymously to refer to the graphic computer-programmed graphical objects that constitute the playing pieces of the game. Each card, playing piece, virtual object, or object has two states, the first analogous to a display of the front side of a card and the second analogous to a display of the back side of a card. Only one state of each object is visible in any given instant. Each card/playing piece/object can be "selected" on a touch-sensitive screen or using a mouse or other input device, in conventional fashion. The playing pieces are constructed in software, typically using object-oriented code, also in conventional fashion. The playing pieces may be constructed in any high-level language, computer code, machine language, etc. without limitation.

Figure 6:
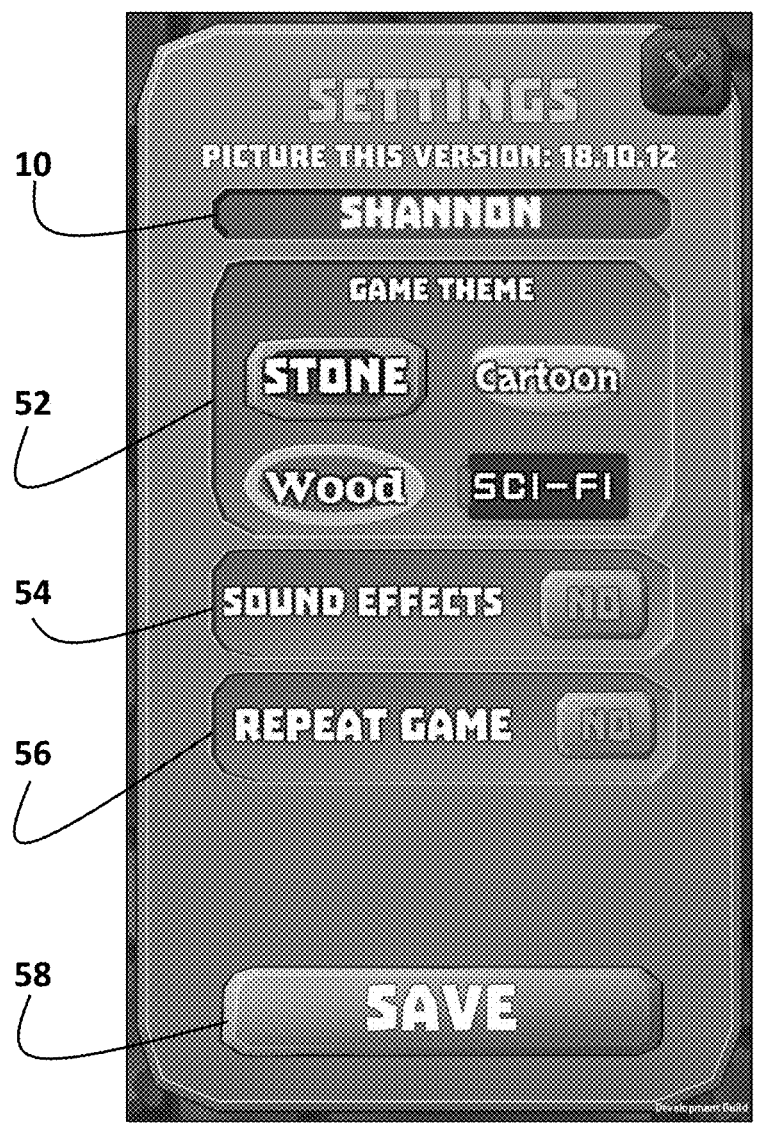
FIG. 6 is an exemplary screen shot of the settings screen for the game.

Referring now to FIG. 1, the exemplary log-in screen would be seen when a person downloads the app the first time. It can be changed as shown in FIG. 6. This first player will be also be referred to as the "creator" of the game. As shown, the log-in screen includes a field 10 for Player 1 to enter a user name. Player 1 uses field 10 to enter a name or nickname by which they will be identified when playing games with others. After creating a user name and indicating they have read and accepted the "Terms and Conditions," the app user Player 1 clicks field 12, "Start Playing," which will take them to the home screen, which is shown in FIG. 2.

Figure 2:
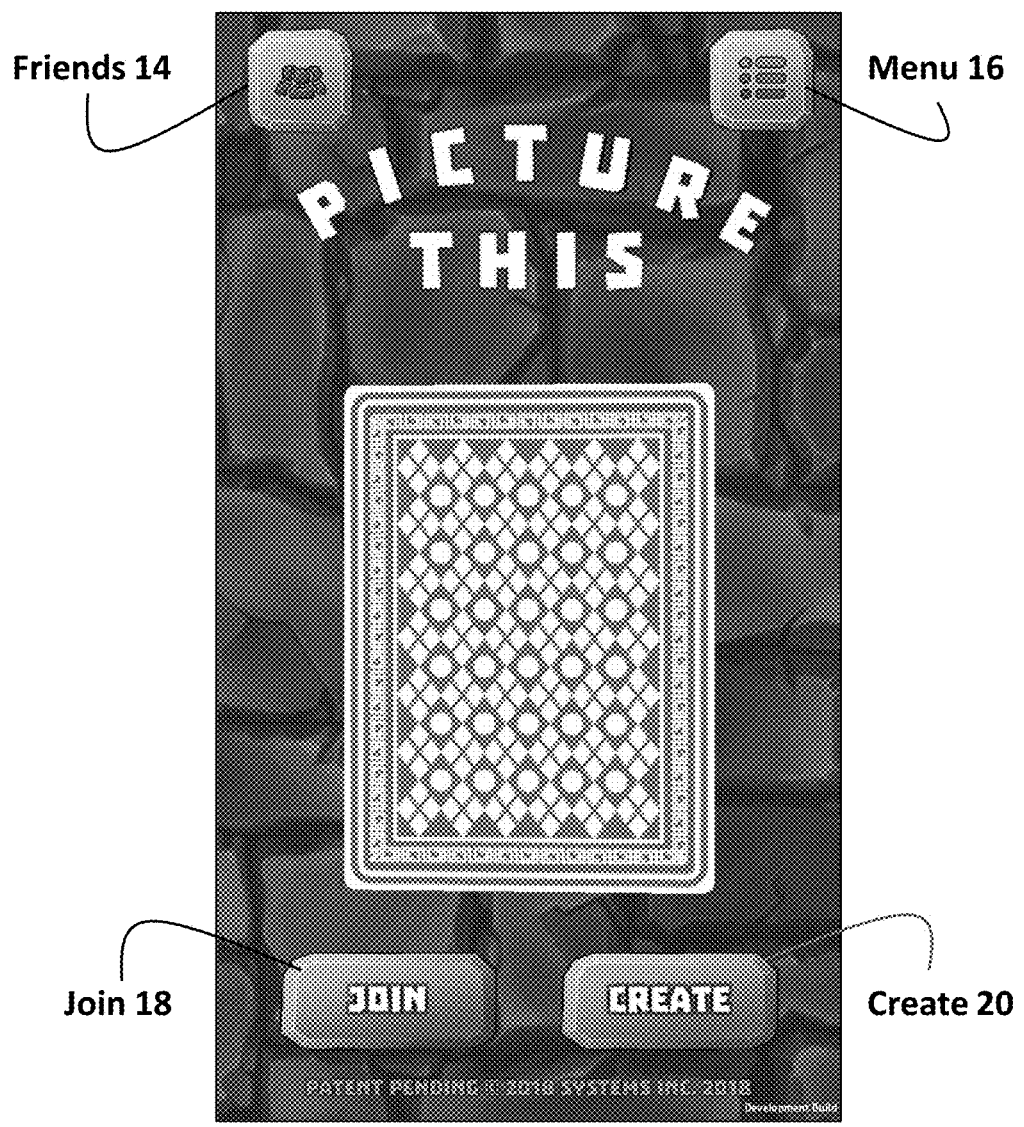
FIG. 2 is an exemplary screen shot of the home screen for the game.

Referring now to FIG. 2, this screen has four buttons. Friends button 14 brings each player to the "Friends" screen. A nickname can be used in order to identify and invite friends. The app user's identity code is shown on the bottom of the "Friends" screen. This screen allows the app user to remove friends or give them a nickname by touching one of the friends on the list. Menu button 16 allows a player to access a main menu screen. Join button 18 provides a link to join a game that another player has created, searching by either the game or by the game's geographical location. Create button 20 allows a player to create a new game.

Figure 3:
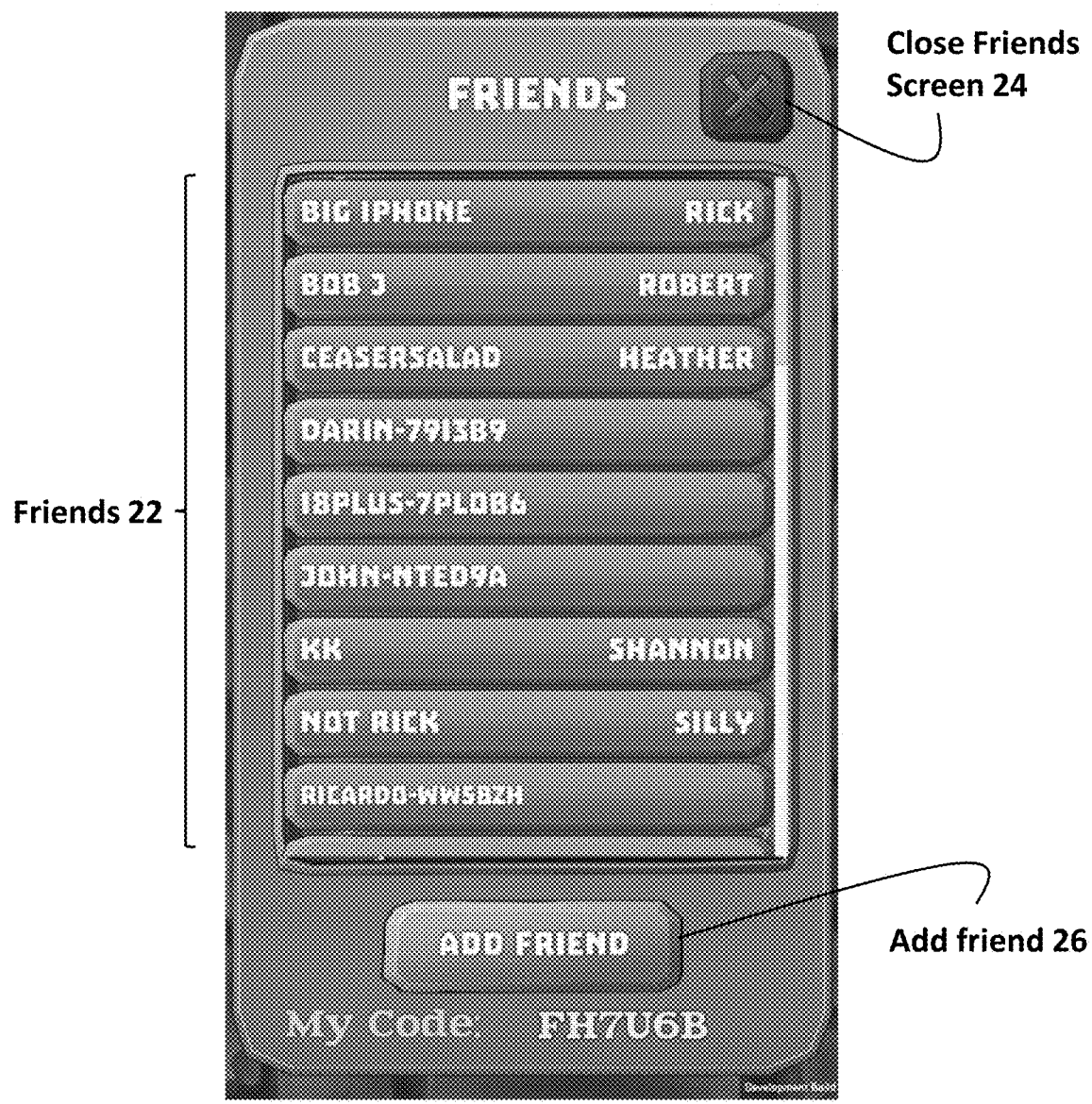
FIG. 3 is an exemplary screen shot of the "Friends Screen" for the game.

Referring now to FIG. 3, by clicking on the Friends button (14 in FIG. 2), a player's friends are displayed. The left side of friend list 22 displays the unique or quasi-unique user name of each player assigned (see FIG. 1); the right side of friend list 22 displays an optional nickname that each friend was given on a player's device. When a player is asked to be a friend, they provide the codes to the user of the app. The "close screen" box 24 closes the Friends screen and brings the player user back to the home screen. The "close screen" box 24 appears on all the screens and functions generally to close the screen currently displayed and to take the user/player either to the home screen, or to a lower level screen if they are in a higher level. The Add Friend button 26 can prompt a creator to add a friend's code or nickname in order to send them an invitation to play games between them. The code is an optional security feature. When it is used, a game creator must obtain the code from other app users to be able to send a friend request when creating games.

Figure 4:
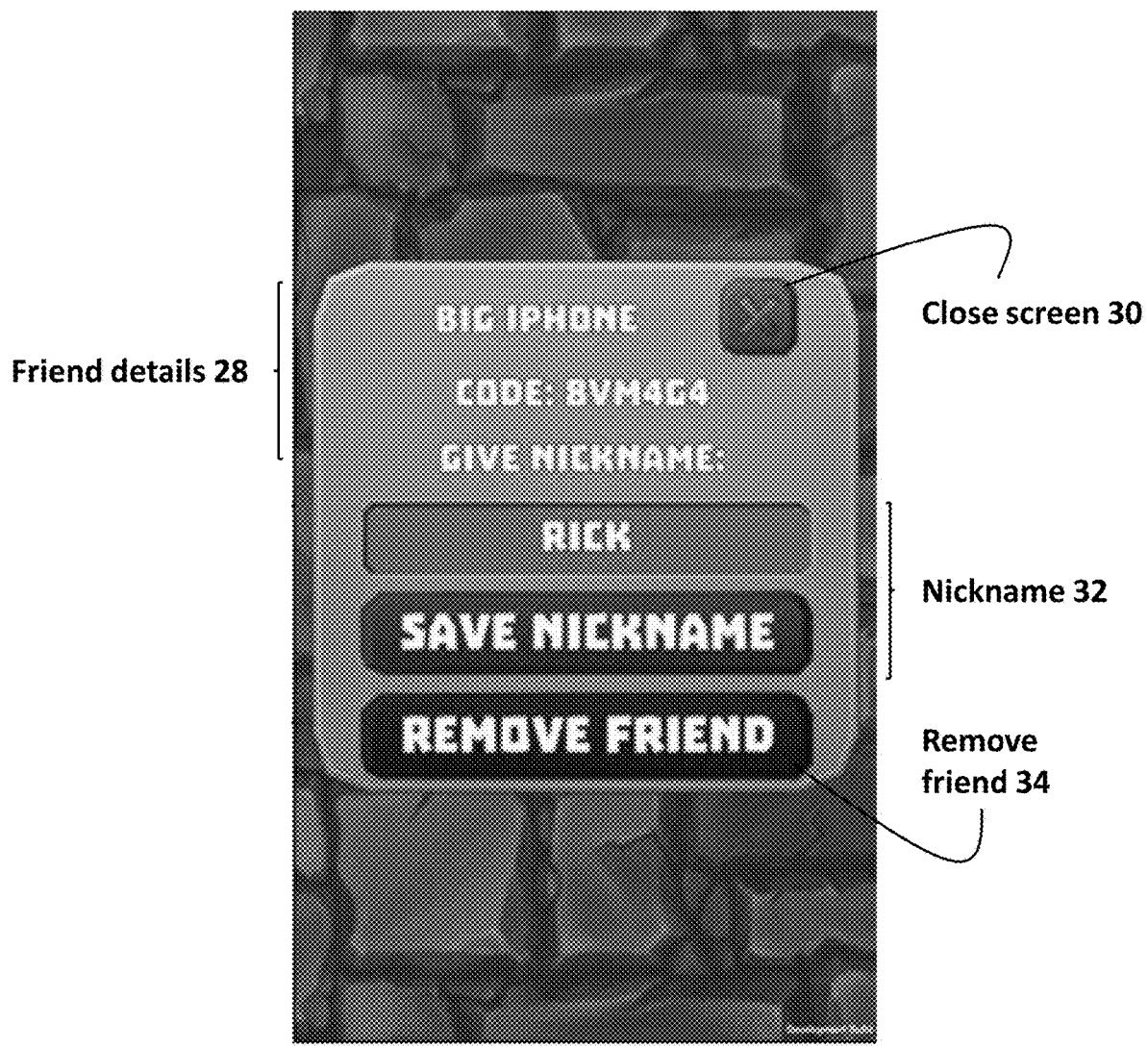
FIG. 4 is an exemplary screen shot of the "Friends Detail Screen" for the game.

FIG. 4 shows the Friends Detail screen, which provides detailed data on each individual player. The Friend Details field 28 displays the user name, code, and nickname of the selected friend. The Remove Friend field 34 removes the user from the friends list. The Nickname field 32 allows a player to create and modify a nickname for each friend playing a game. The nickname is seen only by the player creating the nickname (and not the player being assigned a nickname). Once the nickname has been entered, the player may save the nickname using the "save nickname" box 30. Again, a close screen button (24) as described previously, is in the upper right corner. Clicking on button 24 in the Friends Detail screen takes the player to the main Friends screen.

Figure 5:
FIG. 5 is an exemplary screen shot of the menu screen for the game.

FIG. 5 shows an exemplary Menu screen, which is accessed by clicking on the Menu button 16 (see FIG. 2). The main Menu screen as shown in FIG. 5 includes seven buttons and a link to the privacy policy statement. The seven buttons are:

Settings button 36 brings user to the Settings screen to modify various user settings like game theme, sound effects, repeatability, etc.

Custom Card Backs button 38 directs the user to locations where they can create custom card backs that can be used in games created. This allows a game creator to enhance games used for various special events or to personalize a game, such as a personalized game for the game creator's friends and family. If the user does not have an account, the user is invited to create an account in order to create Custom Card backs. Creating an account with a valid e-mail address and password is only required if one wishes to use "Custom Card Backs" or to use "Card Backs Advertising".

Card Back Advertising button 40 directs the user to locations where they can create Advertisement card backs that will be shown on other player's games they create within selected geographic location(s). These may be used to advertise a business, company and/or product(s) and/or services. If the player does not have an account, the user is invited to create an account in order to create Advertisement card backs. Persons or companies do not have to be "players" or even download the app in order to create card backs. That is, people wanting to advertise using the app can have their products or services advertised on the back of cards being played by others. At "PictureThisGames.com" advertisers can create advertising card backs to be used in games played on apps. To prevent abuse, advertisers must have their card back creations approved by the owners of the app.

Your Statistics button 42 brings the user to the statistics screen to view various game play statistics, such as, but not limited to, number of games played, number of games won, rate of selecting matching pairs of virtual objects, rate of selecting a corresponding caption, and a player's total score. These statistics can be based on the number cards being played in games since a given point in the past (yesterday, last week, last month, last year and forever.) In addition, such statistics can be graphed in order to visually assess trends. Such an application may be useful for monitoring a player's status or evaluating a player's mental improvement.

Premium button 44 provides a link to purchase the premium version of the app and can offer a preview of a variety of generic card backs that will be available to be used in creating games. The Premium version will also block advertising Card Back ads from appearing on the games the person plays. It will not block Custom Card Backs from appearing during games the player participates in where the game creator used a custom card back. If the player does not have an account, the user is invited to create an account. Creating an account with a valid E-Mail address and password is only required if one wishes to purchase the premium version of the app.

Help Guide button 46 brings the user to a help guide on how the various game settings function. Login button 48 allows user to create an account in order to create and use custom card backs and to purchase the Premium edition of the game. Note: The account is not used in the game itself. The account is needed in order to log into a web-site screen where Custom Card backs, Advertisement card backs, and advertisement statistics are displayed. An account also allows playing the game in a browser that can be then projected or shown on a TV.

Privacy Policy button 50 allows access to the Privacy Policy for users of the game. By way of non-limiting example, in one game users provide access to their personal photographs or other indicia that are featured on the front faces of the cards only during a game. The indicia are then destroyed after a maximum of 2 hours after the game is concluded. The privacy policy is unrelated to how the game is played.

FIG. 6 shows the Settings screen, which is accessed by clicking on button 36 in FIG. 5. A number of fields are presented under Settings. Username 10 is the customizable unique or quasi-unique user name that each player uses for identification when playing games with others. This name will replace the user name that was initially set upon downloading the app. This can be modified at any time. Game Theme 52 allows user to set the cosmetic background of their app. Sound Effects 54 allows the user to turn on the sound effects of each players device. Repeat Game 56 allows the user to prompt the player with the option to repeat the game. This saves the creator time if wanting to play more than one game with the same settings and objects to provide repetition. Save 58 allows the user to save any changes made to the settings options.

Figure 7:
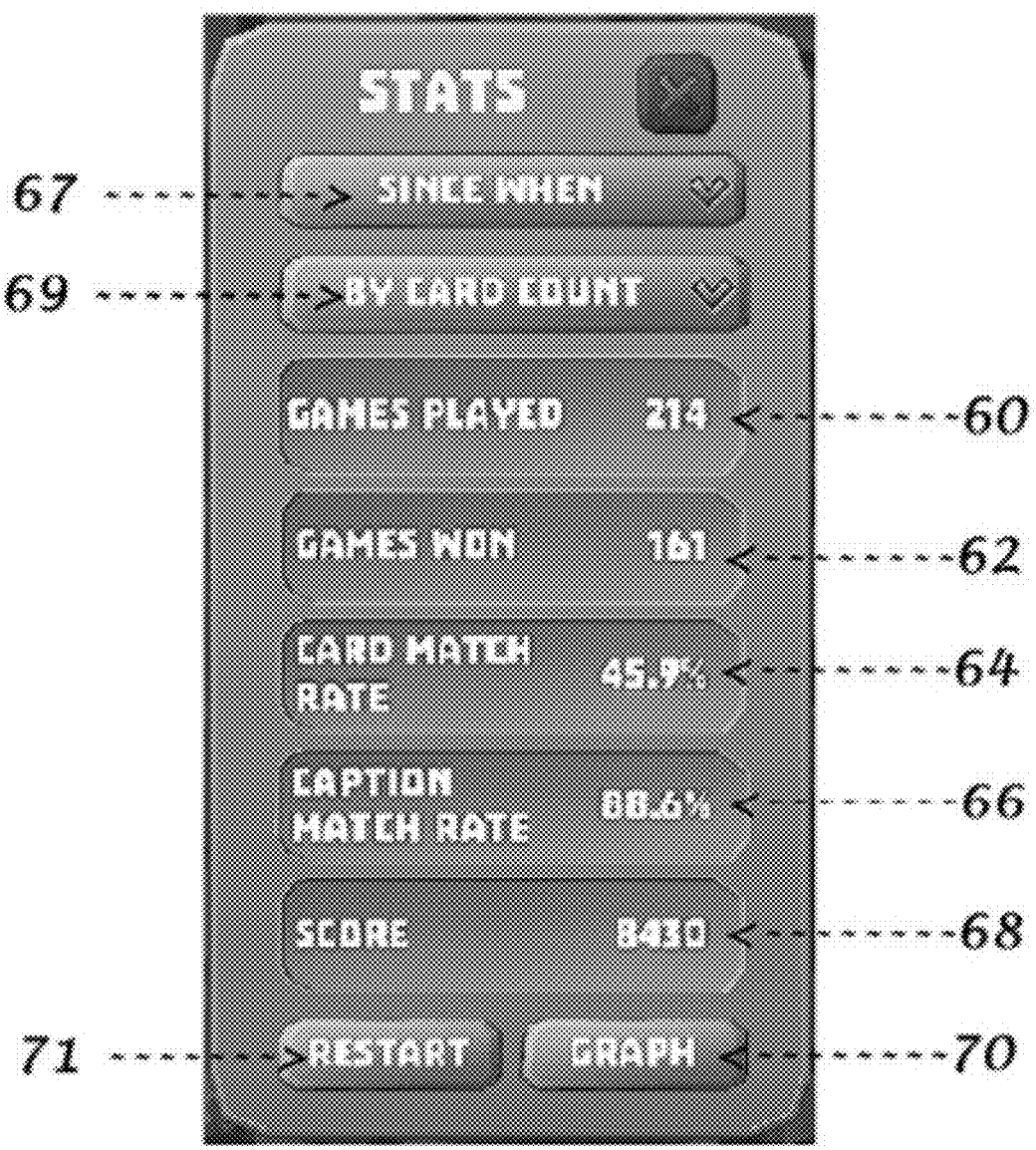
FIG. 7 is an exemplary screen shot of the statistics screen for the game.

A Statistics screen is shown in FIG. 7. The Statistics screen is accessed by clicking on the Your Statistics button 42, as shown in FIG. 5. Representative statistics are accumulated on this page and may include the following (by way of example and not limitation). Games Played 60 shows total number of games played. Games Won 62 shows total number of games won. Card Match Rate 64 displays the rate of matching cards. Caption Match Rate 66 displays the rate of matching captions to paired card matches. Score 68 shows the total amount of points earned by the player. GRAPH 70 presents statistics in a graphic form. RESTART 71 sets the system to a given point in time which will continue until the next Restart. SINCE WHEN 67 sets a time in the past to compute statistics with the options: "Forever", "Yesterday", "A week ago", "A month ago", "A year ago", and the last "Restart". BY CARD COUNT 69 allows the player to view statistics based on the number of cards being played for each game played and include: "All", "6", "12", "20", "24", "30", "42", "48", and "56".

Figure 8:
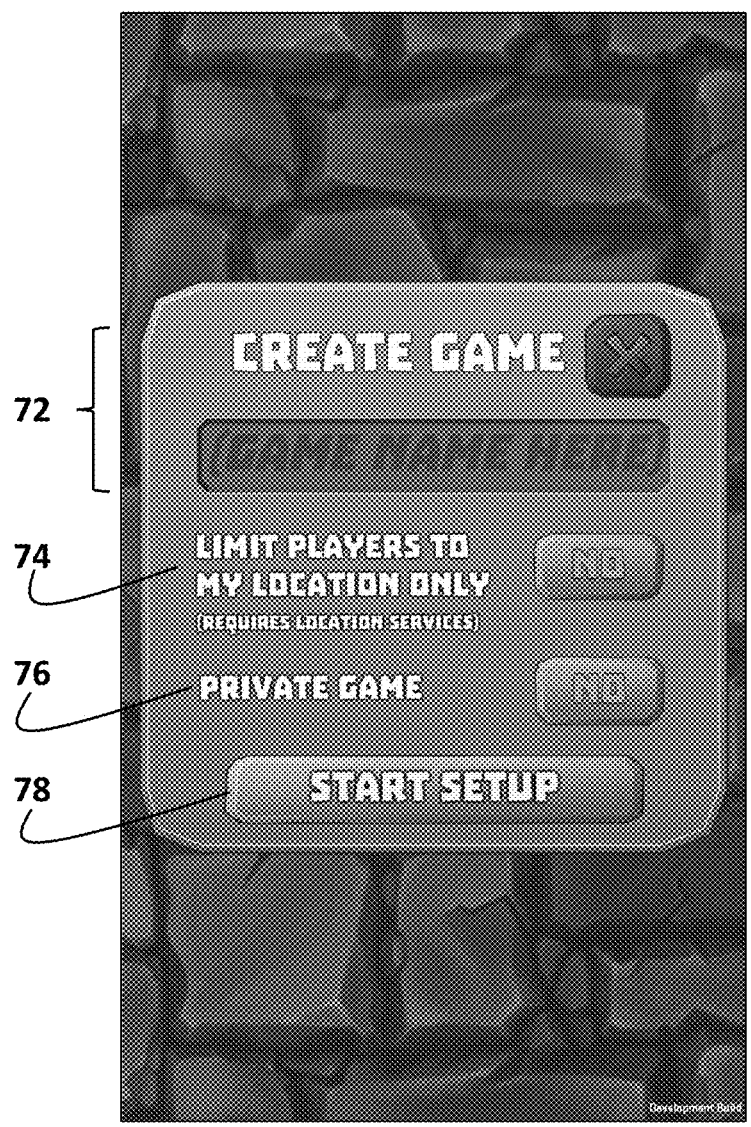
FIG. 8 is an exemplary screen shot of the first "Creating a Game" sub-screen for the game.

FIG. 8 shows an example of the Creating a Game screen. This screen is accessed by clicking button 20 as shown in FIG. 2. Creating a game includes several required steps and a number of optional steps. First, a game name may be provided by a game creator (button 72). The name (if desired) will be displayed in the "Game Name Here" field. Optionally, the game may be limited to players within a geographic range. This is done using the Limit Players to My Location Only button 74. If this feature is activated, showing the game name will be limited to players searching for games within an approximately 1000-foot radius of the player creating the game. (The radius is a function of the limits of wireless local area network technologies.) If networked, the game can be limited geographically by network IP address. In contrast, the Private Game button 76 will limit the game only to those players manually invited to play by the game creator or a player is given the game name by some means. If the game is set as Private, the game name will not be displayed to the public. Note: having location services turned on will enhance the accuracy of limiting players to only those near the player's location. The Start Setup button 78 take the player/creator to the next screen to begin custom set up of the game to be played.

Figure 9:
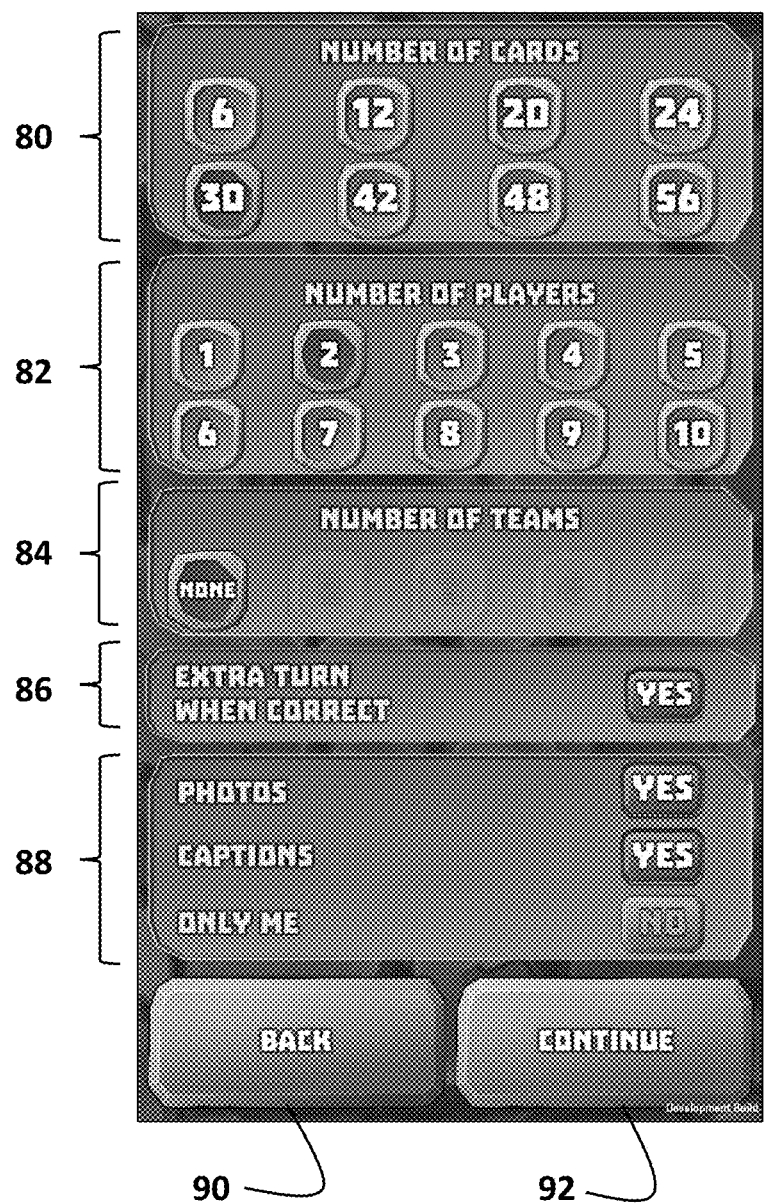
FIG. 9 is an exemplary screen shot of the second "Creating a Game" sub-screen for the game.
Figure 10:
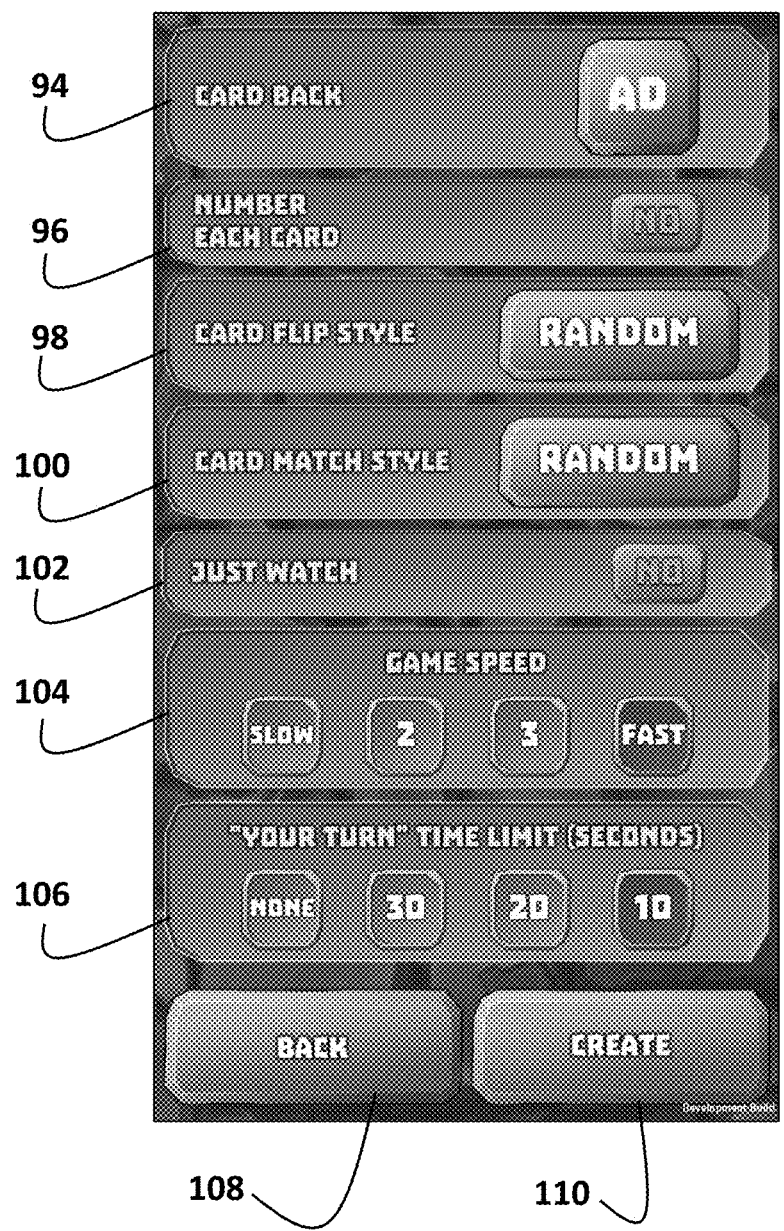
FIG. 10 is an exemplary screen shot of the third "Creating a Game" sub-screen for the game.

Referring now to FIGS. 9 and 10, these two screens present all of the variables that can be employed to create a unique, competitive and ever-changing game. FIG. 9 presents fields for setting the following parameters:

Number of Cards 80 sets the desired number of cards for the game. The displayed choices are even number so that every card has a matching pair (e.g., 24 cards yields 12 pairs, 56 cards yields 28 pairs, etc.). The game becomes more challenging as the number of cards increases.

Number of Players 82 sets the number of people that will be playing the game.

Number of Teams 84 sets the game so that players compete on an individual basis (No Teams) or as part of a team. The number of teams possible will be dependent on the number of players in such a way that each team has the same number of players.

Extra Turn When Correct 86 provides that when a player makes a match, that player continues playing until they make a mismatch. When deactivated, each player will only get one turn regardless of whether a match is made. (Note: if the "Captions" feature is turned on (see below), then the player will only get another turn if they also guess the caption correctly).

Photos 88a allows the creator to add custom photos to the face of each playing card. When deactivated, the face of each card will appear as conventional playing cards, that is, 2, 3, 4, 5, 6, 7, 8, 9, 10, Jack, Queen, King, and Ace of all four suits (clubs, diamonds, hearts, and spades).

Caption 88b allows the creator to associate a corresponding caption with each pair of matched photos shown on the face of a matched pair of cards. This feature can be used to increase the complexity of the game by requiring players to match not only the image shown on two cards, but then also to guess the caption from a drop-down list of possible correct answers. If the player identifies the caption, additional points (e.g, doubled) are added to their score. For example, if the images to be matched are photographs of people or places, the captions could be the names of those people and places, respectively. When a player then matches two cards, the player can earn additional points by naming the person or the place shown in the matched pair of cards.

Only Me 88c allows the creator to attach all photos or images that will be associated with the playing cards. If this option is deactivated, the number of photos to be associated with the playing cards is split equally among the players as close as possible. For example, if the game is designated to be played with 48 cards, 24 images will be required. (Each image is affixed to two cards to make a matched pair, yielding 48 cards total.) If four players are playing, each will be prompted to upload six photos. The "OK" button (FIG. 14, 140) is pressed when all of the images have been uploaded. Pressing the Back button 90 (FIG. 9, 90) ends game creation and brings user/creator back to the home screen. Pressing the Continue button 92 brings the use/creator to the setup screen shown in FIG. 10.

The screen shown in FIG. 10 allows the game creator to customize the back face of each playing card and to customize the other aspects of game play:

Card Back 94 allows the game creator to select the appearance of the back of each playing card. With the default option of "AD", the card back of all players will display an advertisement card back unless the creator has custom card backs where all players will display the creator's choice of a Custom Card Back.

Number Each Card 96 will sequentially number each card in the game for an additional means of tracking or selecting the cards during game play. This feature might be used when the game is being played by a group of people with teams or player(s) who are not physically capable of selecting cards other than with verbal indications or where a "player" is more than one person.

Card Flip Style 98 controls the animation when each individual card is flipped.

Card Match Style 100 controls the animation of the cards when a match is made, and the card is removed from the board.

Just Watch 102 allows the creator to create and observe a game, but not be an active player. The creator can only watch the game as it is being played by others. In effect, the creator acts only as an administrator to set up each game. This option may be used, by way of non-limiting example, when the game is being played in a party setting, in a large setting such as a fundraiser, or when the game is created for another person to play as a "gift" to that person or the player receiving an invite is not capable of creating a game due to a handicap such as memory loss or disability.

Game Speed 104 controls how quickly cards turn over, how long the face of the card is enlarged and displayed, and how long the chosen two cards are displayed after being turned over during game play. That is, at the start of each player's turn, all of the cards are set face-down. The player then clicks on two of the cards to "flip" them face-up so that the image on the face of each card can be seen. Setting the "Game Speed" function to its fastest level make the game much more difficult because each player is given only a very short window of time to view the two cards before they are returned to the face-down position.

"Your Turn" Time Limit 106 controls the maximum amount of time a player has during their turn.

The Back button 108 brings the user back to the previous setup screen shown in FIG. 9. The Create button 110 creates the game according to the parameters selected in the set-up screen just described.

Figure 11:
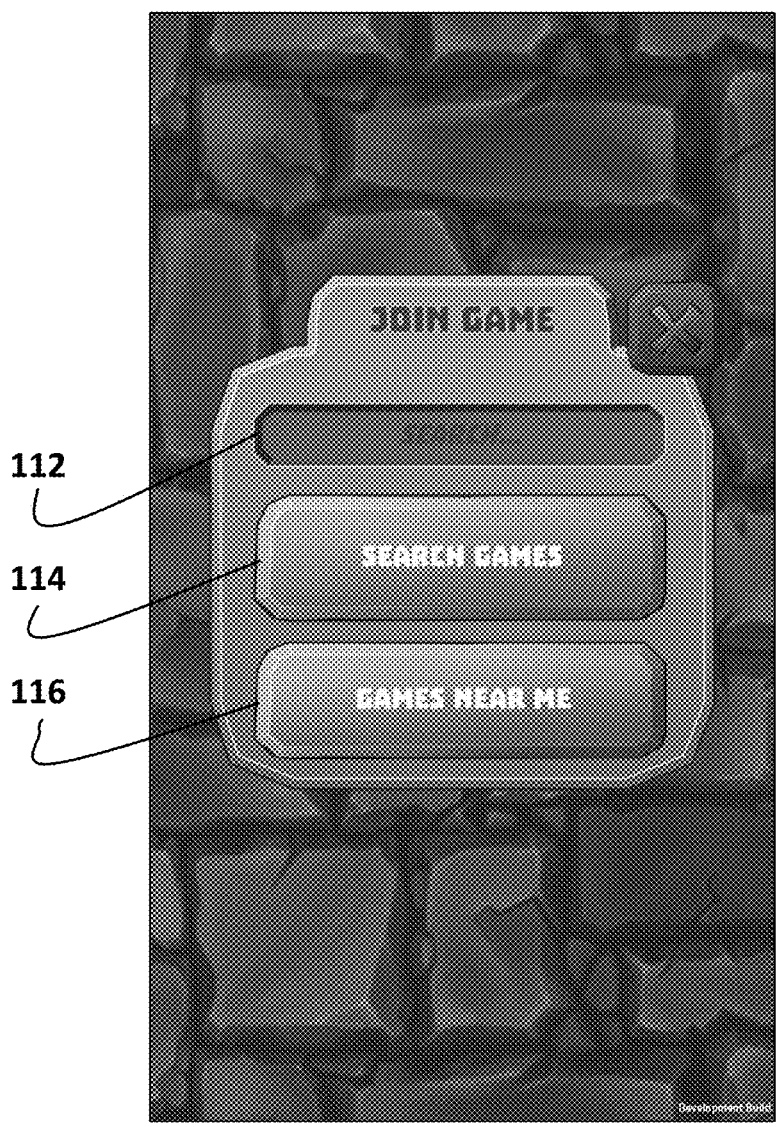
FIG. 11 is an exemplary screen shot of the first "Joining a Game" sub-screen for the game.

FIG. 11 depicts an exemplary Joining a Game screen. If a player knows the name of a private game, it can be typed into the Search Games field 112. The Search Games button 114 is then clicked to see if a private game is available. The Games Near Me button 116 displays the 20 closest games nearest to the mobile device's location, geographically. The creator and player must have Location Services enabled on their mobile device for this feature to accurately recognize game location.

Figure 12:
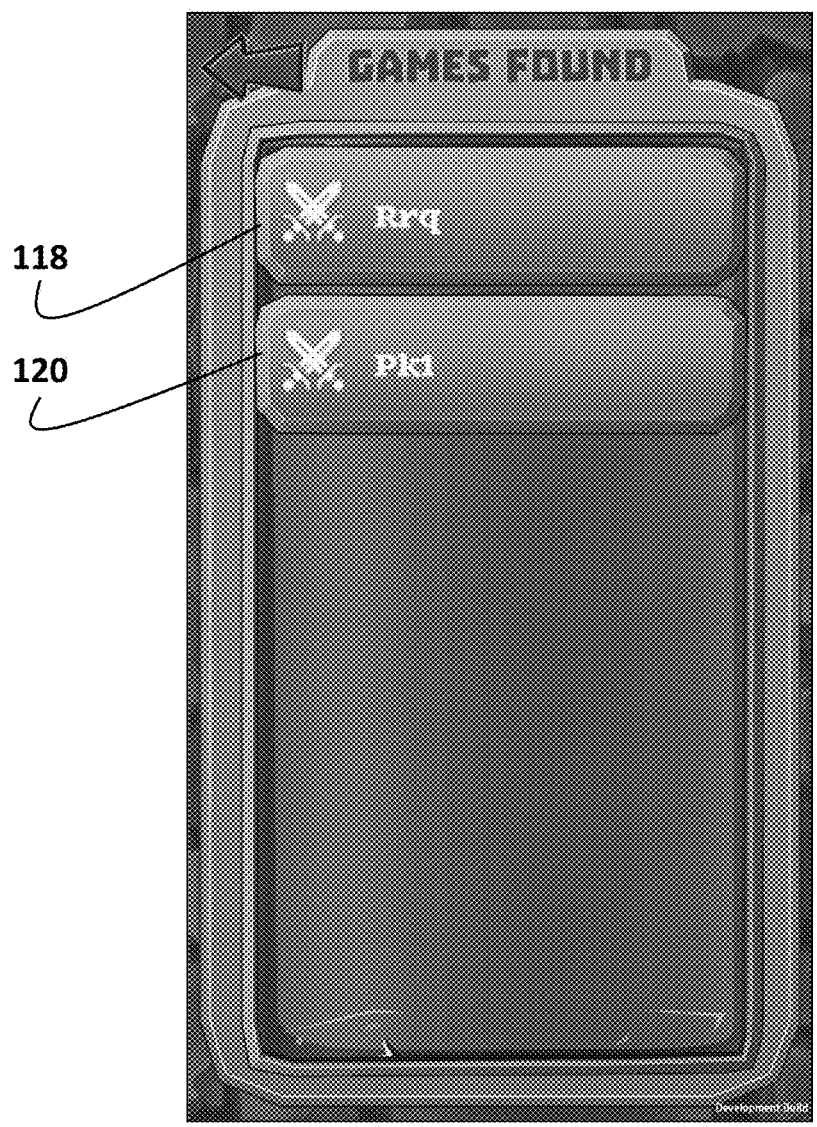
FIG. 12 is an exemplary screen shot of the second "Joining a Game" sub-screen for the game.

Referring now to FIG. 12, if a game is found in the search function shown in FIG. 11, the game can be joined by selecting it in the Games List drop box shown in FIG. 12. As shown in the figure, two games are available to join, Rrq (118a) and Pkt (118b). The back arrow 120 at the top left of the screen will exit the Games List and bring the user back to the Join Game screen. If a game is selected, by clicking on one of buttons 118a or 118b, the player is taken to the screen shown in FIG. 13

Figure 13:
FIG. 13 is an exemplary screen shot of the third "Joining a Game" sub-screen for the game.

FIG. 13 depicts various game details in field 124, such as the creator ("Serge"), the number of cards ("24 cards"), and the current number of players in the game ("1/6"). The Join button 126 is clicked for the player to join that specific game and to upload photos if requested by the creator. The back arrow 122 takes the player out of the Game details screen and brings the player back to the Games List drop box shown in FIG. 12.

Figure 14:
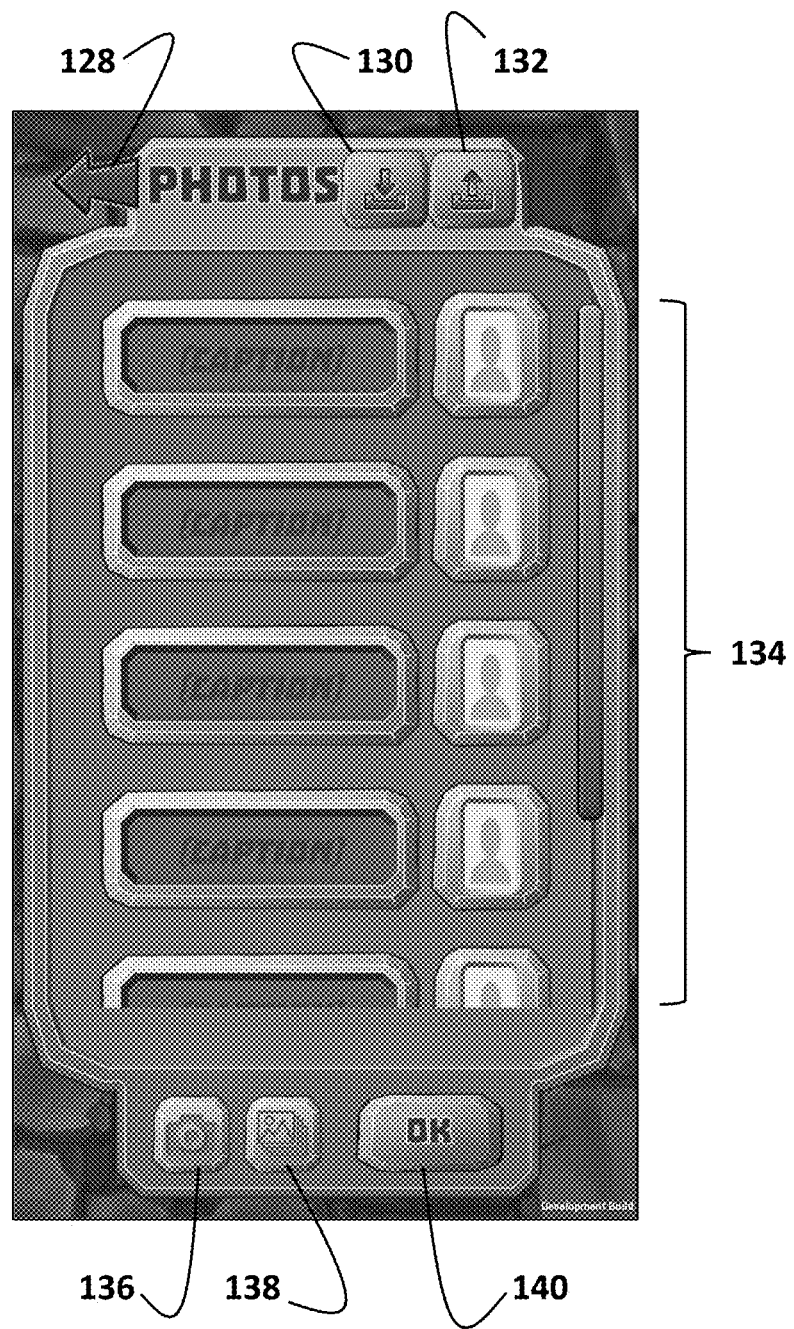
FIG. 14 is an exemplary screen shot of the "Adding Photos/Captions" screen for the game.

Referring now to FIG. 14, this is the screen where players upload the photos and captions to be used in the game. This screen will appear to a creator when setting up a game with "Photos" marked as YES. This screen will also appear to a player when joining a game with "Photos" marked as YES, and "Only Me" marked as NO. The back arrow 128 will take the player out of the current game and bring the player back to the home screen. The down arrow 130 saves the currently linked photos/captions as a preset, so they can be easily retrieved for use in future games. The up arrow 132 loads saved presets—thereby enabling players to quickly upload desired photos and their corresponding captions that were used in previous games. The Camera button 136, when clicked, brings up the on-board camera on the player's cell phone, tablet, or other mobile device, to take a new picture to upload to the game. (The photo so taken will not be saved on the device library but can be saved as a "pre-set") The Photo button (defaulted), 138, when clicked, accesses the photo library on the player's cell phone, tablet, or other mobile device. The player can then select the photos they wish to be uploaded to the game from among existing photos. (Note: Up to eight (8) photos can be picked from a player's library with a single "trip" to their library).

Regardless of the origin of each photo, clicking on a photo will populate the Photo/Caption field 134 and if "Captions" (FIG. 9, 88) is YES, the player can create the related caption. Each photo uploaded to the game is shown to the right of the text entry fields labeled "CAPTION" in field 134. As each photo appears, the user may then (optionally) click on either the PHOTO or the CAPTION fields to reload a photo and caption or just the CAPTION field to change a caption. Once the required number of photos and captions are uploaded, the player clicks the OK button 140.

Figure 15:
FIG. 15 is an exemplary screen shot of the first "Playing a Game" sub-screen for the game.

Referring now to FIG. 15, each game can be played by individual players or by teams. The field 142 shown in FIG. 15 allowed the individual players to divide themselves into teams. When first starting a game, field 142 will display the names of the players who have joined so far. The user names will appear in a distinct format, such as a green font as in "Shannon21" in FIG. 15, if that player has uploaded pictures is ready to play. When a joined player presses a particular team that has available openings, that player will be put on that team. If the game is started, any players not identified with a team will be assigned to a team.

The Leave Game button 144 is used to leave a game in progress or when it is finished. When a player leaves in the middle of an active game, that player is replaced by an automatic player (a Bot) that selects cards randomly. The Invite button 146 is used to invite players to the game. The Start button 148 begins the game if a full slate of players is not realized. If a full slate of players have joined and are ready (all photos and possible captions have been selected), the game will start automatically.

Figure 16:
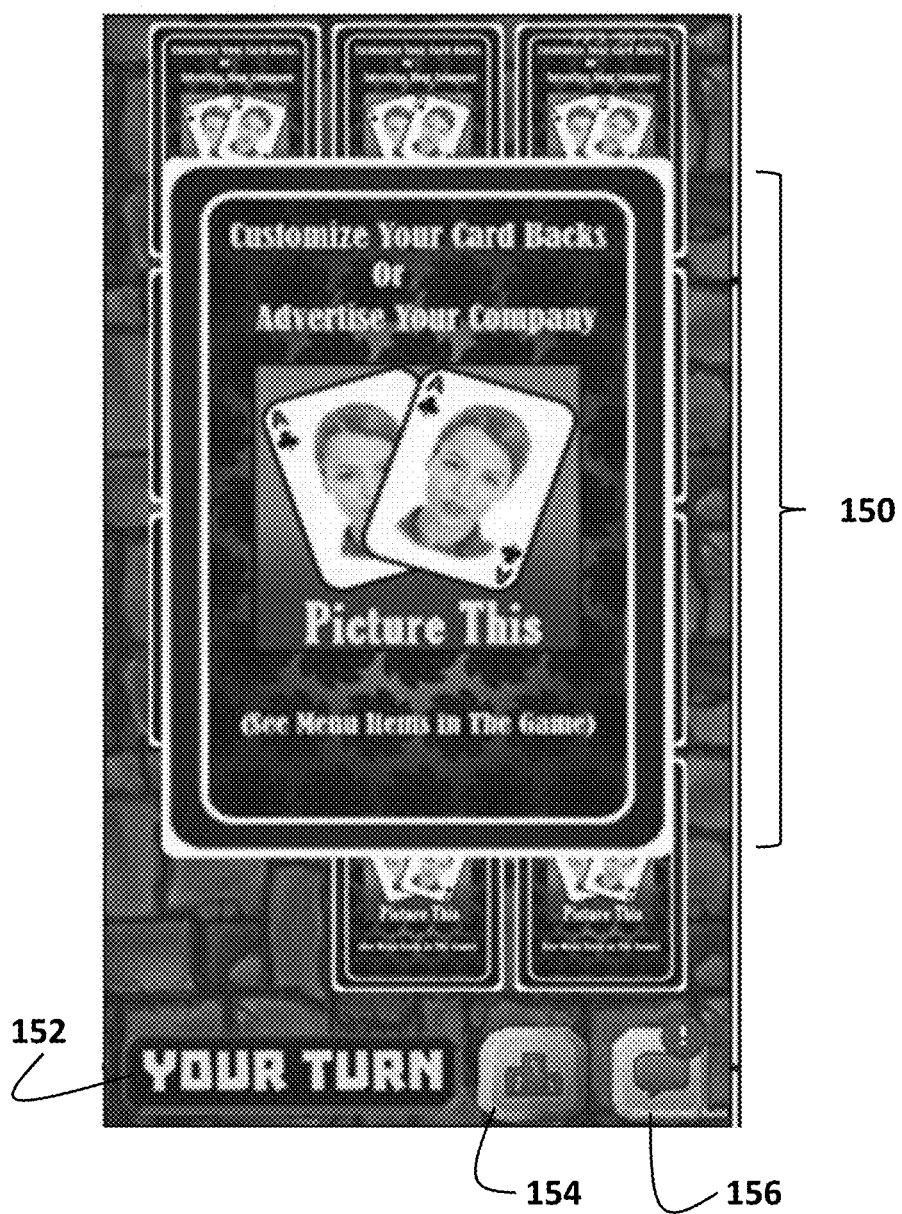
FIG. 16 is an exemplary screen shot of the second "Playing a Game" sub-screen for the game.

FIG. 16 shows the game playing 150. This is where the cards will be displayed based on the creator's settings. In the background of field 150 are the back sides of all of the playing cards in the game. That is, FIG. 16 shows the cards turned face down. At each player's turn, a player clicks on a first card to flip it over to see the front of the first card. The player then clicks on a second card to see if the image on the front of the second card matches the image on the first card. The object is to match as many pairs as possible. The "Your Turn" field 152 will be highlighted for each player when it is that player's turn. If a time limit has been selected when setting up the game, a countdown timer appears in field 152 as soon as the player's turn begins. The game continues, with each player selecting and "flipping" two cards per turn, until all of the card images are matched.

Text messages can be exchanged (i.e., "live chat" or direct messaging between two players) between the players using the Message button 156. A symbol, such as a red exclamation symbol, can be used to show that there are unread messages for a player. A Player info button 154 is configured to open the Player Information screen when clicked. Button 154 will display current players, scores, and allows a player to leave the game via the Player Information screen if desired.

Figure 17:
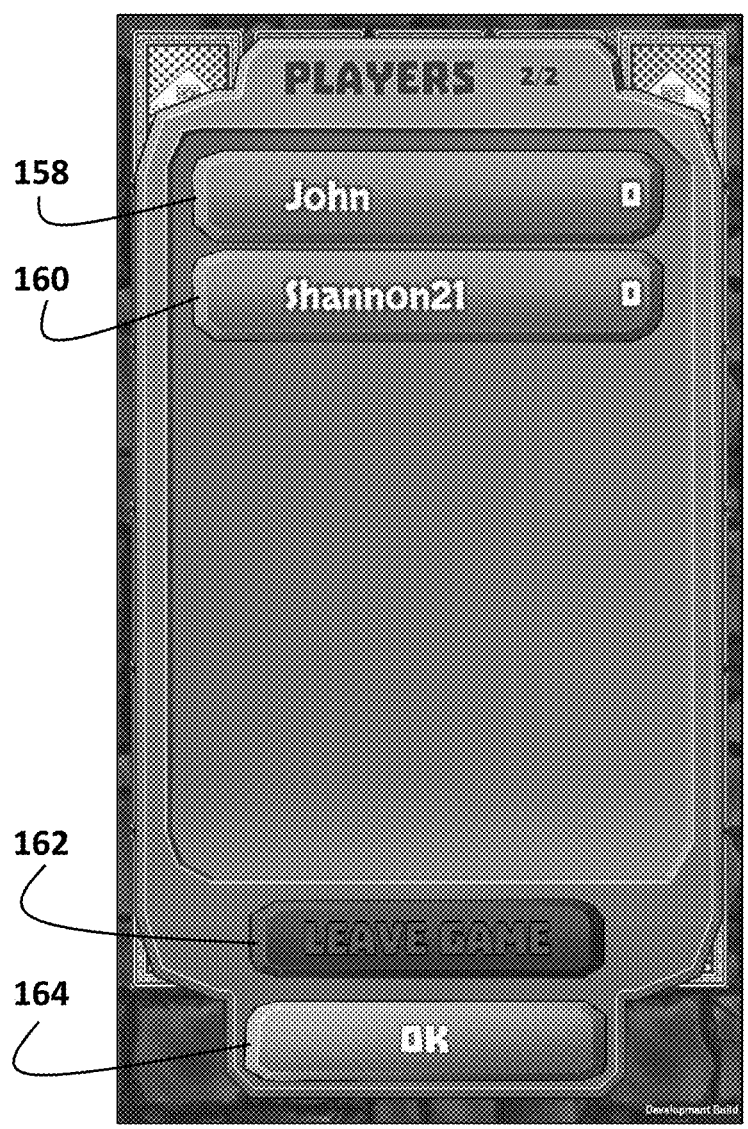
FIG. 17 is an exemplary screen shot of the third "Playing a Game" sub-screen for the game.

FIG. 17 is a Player Information screen. Buttons 158 and 160 display the names of current players and their respective scores. Clicking a player's button (i.e., 158 or 160) brings up that player's chat screen to send the player a text message. The Leave Game button 162 functions as described previously. Clicking on the OK button 164 closes the player information screen and return to the game.

Figure 18:
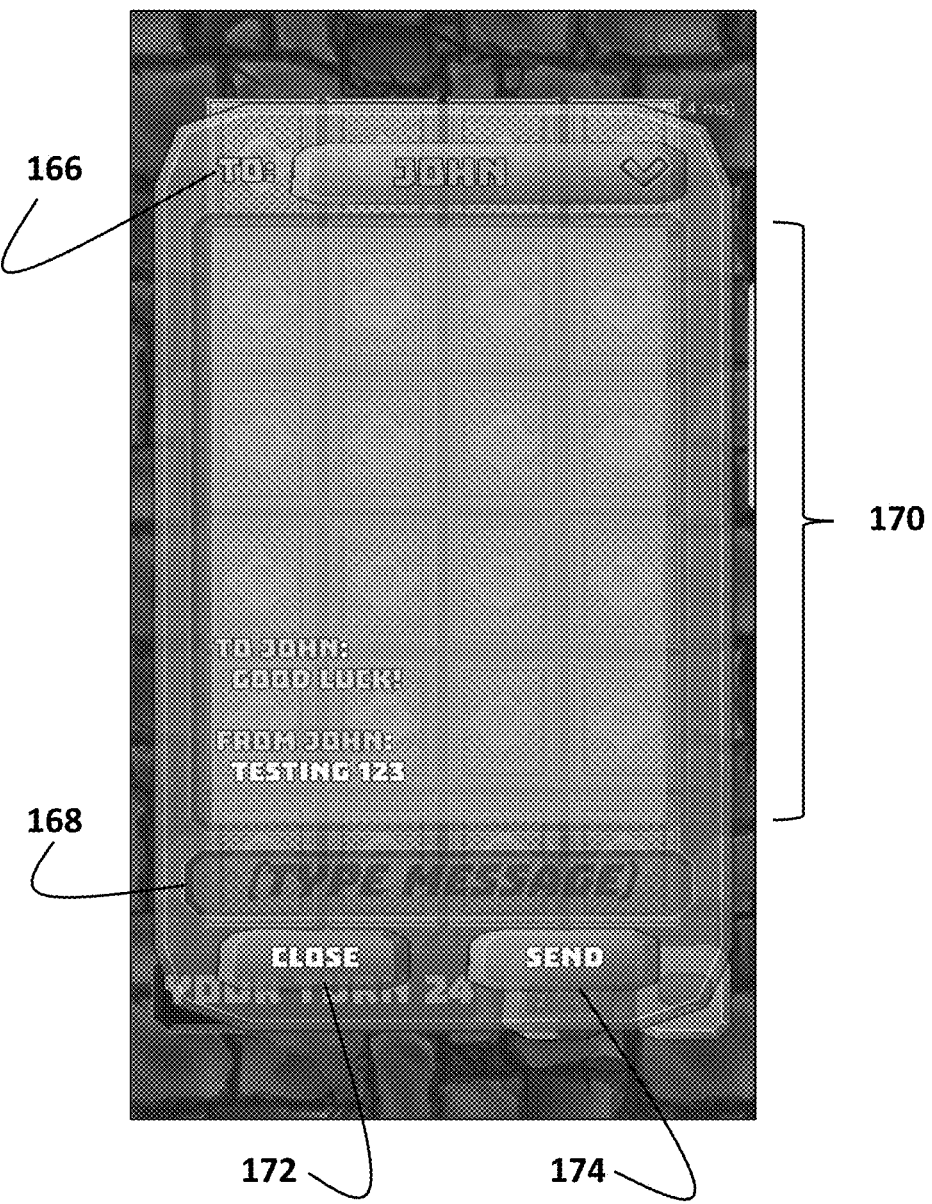
FIG. 18 is an exemplary screen shot of the fourth "Playing a Game" sub-screen for the game, which is also the messaging screen that allows players to extend text messages with one another when playing remotely.

Referring now to FIG. 18, this shows an exemplary Message screen. A conversation panel 170 displays the message history between a first player and another selected player, as described previously. Field 168 is a "Type Message" box. A player types messages to other players into field 168. The "To" button 166 displays the name of the recipient of the message. After typing a message into field 168, pressing the Send button 174 will send the message to its intended recipient. Clicking the Close button 172 closes the message screen and returns the user to the game screen shown at FIG. 16.

Figure 19:
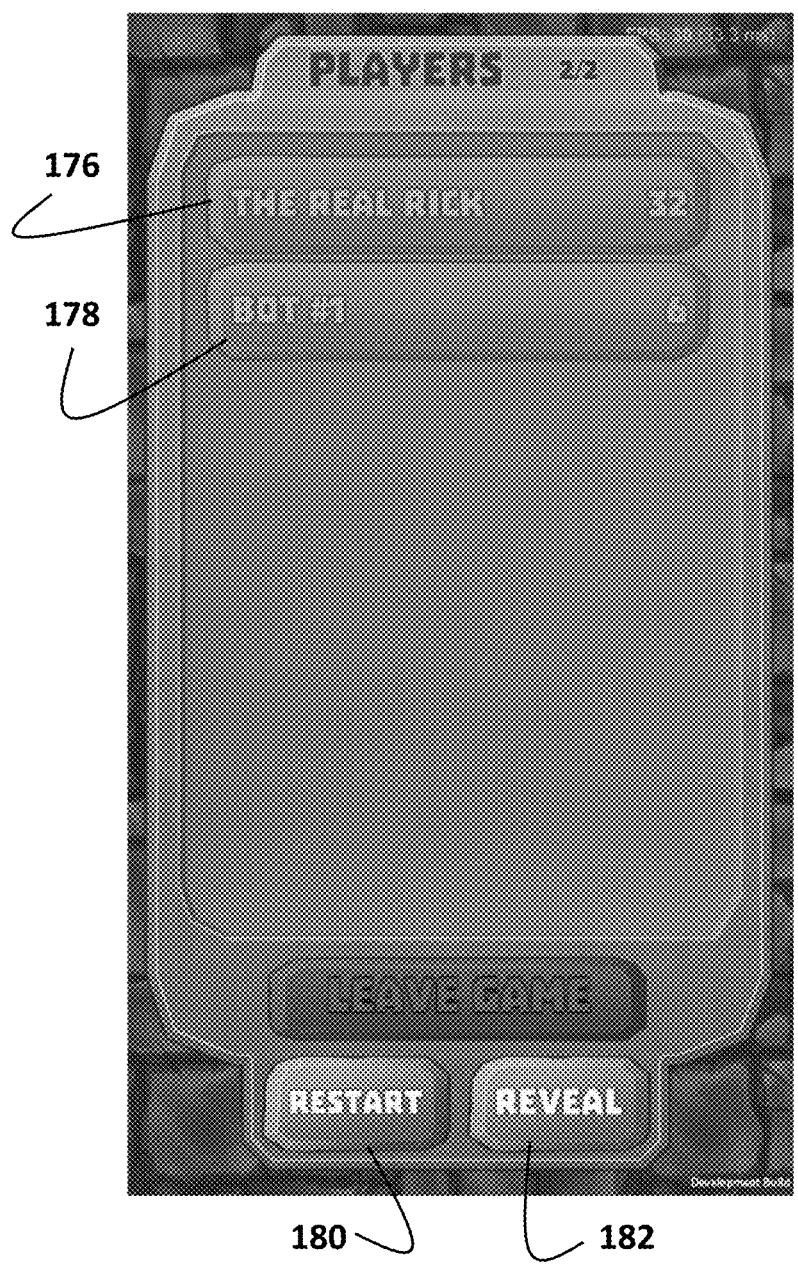
FIG. 19 is an exemplary screen shot of the "Game Over" screen.

FIG. 19 shows the Finished Game screen. Fields 176 and 178 show the names of the players who completed until the end of the game and their respective scores. As shown in FIG. 19, "THE REAL RICK" won with 32 points, while "BOT #1" was in a distant second place with only 6 points. Pressing the Leave Game button returns the player to the home screen, as described previously. The Restart button 180 is configured to permit the game creator to start another game identical to the one just played if Repeat Game was YES in Settings. The Reveal button 182 brings a player to the playing field shown in FIG. 16, but with all of the cards revealed (i.e., face-up).

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made. The articles "a" and "an" mean "one or more."

All combinations of method or process steps as used herein can be performed in any order, unless otherwise specified or clearly implied to the contrary by the context in which the referenced combination is made.

The methods described herein can comprise, consist of, or consist essentially of the essential elements and limitations of the method described herein, as well as any additional or optional ingredients, components, or limitations described herein or otherwise useful in programming a multi-player game in a networked computing environment.

What is claimed is:

1. A method of providing a memory-enhancing game on at least one networked computing device, the method comprising:
    storing a plurality of source images on the at least one networked computing device;
    associating each of the plurality of source images with a corresponding pair of virtual objects on at least one graphical user interface (GUI) on the at least one networked computing device, each virtual object in each pair of virtual objects having a first state in which the source image associated with the virtual object is not displayed on the at least one GUI and a second state in which the source image associated with the virtual object is displayed on the at least one GUI;
    displaying on the at least one GUI a plurality of the corresponding pairs of virtual objects, in randomized positions, with all of the virtual objects in the first state;
    receiving a selection of two virtual objects from at least one player,
        wherein a selected virtual object in the first state will convert the selected virtual object into the second state for a pre-selected period of time after which the selected virtual object returns to the first state,
        wherein if the two virtual objects are associated with the same source image, the at least one player is awarded at least one point and the two virtual objects remain in the second state on the at least one GUI or are removed from the at least one GUI; and
    repeating receiving a selection of two virtual objects from at least one player until each virtual object remains in the second state on the at least one GUI or is removed from the at least one GUI;
    wherein each of the plurality of source images is associated with a corresponding caption; and
    further comprising associating each of the plurality of source images and the corresponding caption with the corresponding pair of virtual objects on the at least one GUI;
    wherein in the second state the source image and a plurality of captions including the corresponding caption associated with the virtual object are displayed on the at least one GUI.

2. The method of claim 1, further comprising receiving a selection of a caption from the at least one player.

3. The method of claim 1, further comprising receiving a game name from at least one player before storing the plurality of source images on the at least one networked computing device.

4. The method of claim 1, further comprising storing at least one advertising image on the at least one networked computing device and associating the at least one advertising image with the virtual objects, wherein in the first state of each virtual object the at least one advertising image associated with the virtual object is displayed on the at least one GUI.

5. The method of claim 1, further comprising the step of recording at least one statistic of game play of the at least one player, wherein the at least one statistic of game play is selected from the group consisting of: number of games played, number of games won, rate of matching cards per a time frame and number of cards played by game, rate of matching captions a per time frame and number of cards played by game, and a trend in any of the preceding statistics of game play.

6. The method of claim 5, further comprising the step of transmitting the at least one statistic of game play of the at least one player to a separate party.

7. The method of claim 1, further comprising the step of receiving at least one parameter of game play from at least one creator, wherein the at least one parameter of game play is selected from the group consisting of: game theme, sound effects, game repeatability, number of virtual objects, number of players, number of teams of players, turn repeatability, use of captions, game speed, and play time limit.

8. A method of providing a memory-enhancing game on a plurality of networked computing devices, the method comprising:
- storing a plurality of source images on a corresponding plurality of networked computing devices;
- associating each of the plurality of source images with a corresponding pair of virtual objects on a plurality of graphical user interfaces (GUIs) on the plurality of networked computing devices, each virtual object in each pair of virtual objects having a first state in which the source image associated with the virtual object is not displayed on the plurality of GUIs and a second state in which the source image associated with the virtual object is displayed on the plurality of GUIs;
- displaying on the plurality of GUIs a plurality of the corresponding pairs of virtual objects, in randomized positions, with all of the virtual objects in the first state;
- receiving a selection of two virtual objects from at least one player on one of the plurality of GUIs,
  - wherein a selected virtual object in the first state will convert the selected virtual object into the second state for a pre-selected period of time after which the selected virtual object returns to the first state,
  - wherein if the two virtual objects are associated with the same source image, the at least one player is awarded at least one point and the two virtual objects remain in the second state on the plurality of GUIs or are removed from the at plurality of GUIs; and
- repeating permitting at least one player to select two virtual objects until each virtual object remains in the second state on the plurality of GUIs or is removed from the plurality of GUIs;
- wherein the at least one player is a plurality of players, wherein each of the plurality of players is associated with one of a plurality of teams, and wherein each of the plurality of teams is associated with one of the plurality of GUIs.

9. The method of claim 8, further comprising displaying a list of the plurality of players currently playing the memory-enhancing game on one of the plurality of GUIs.

10. The method of claim 8, further comprising receiving a selection of two virtual objects from at least one team of the plurality of teams on one of the plurality of GUIs and receiving a second selection of two virtual objects from at least one other team of the plurality of teams on another of the plurality of GUIs.

11. The method of claim 8, further comprising receiving a game name from the at least one player before storing the plurality of source images on the computing device.

12. The method of claim 11, further comprising receiving the game name from a separate player and allowing the separate player to access the memory-enhancing game.

13. The method of claim 8, further comprising receiving a game name from a creator before storing the plurality of source images on the computing device, wherein the creator is not the at least one player and each of the creator and the at least one player is associated with one of the plurality of GUIs.

* * * * *